United States Patent
Takeoka et al.

(10) Patent No.: US 9,774,037 B2
(45) Date of Patent: Sep. 26, 2017

(54) POSITIVE ELECTRODE COMPOSITION FOR NON-AQUEOUS ELECTROLYTE SECONDARY BATTERY, METHOD OF MANUFACTURING THEREOF, AND NON-AQUEOUS ELECTROLYTE SECONDARY BATTERY

(71) Applicant: NICHIA CORPORATION, Anan-shi, Tokushima (JP)

(72) Inventors: Atsushi Takeoka, Anan (JP); Yu Nishita, Tokushima (JP)

(73) Assignee: NICHIA CORPORATION, Anon-shi, Tokushima (JP)

( * ) Notice: Subject to any disclaimer, the term of this patent is extended or adjusted under 35 U.S.C. 154(b) by 0 days.

(21) Appl. No.: 14/515,730

(22) Filed: Oct. 16, 2014

(65) Prior Publication Data

US 2015/0108397 A1  Apr. 23, 2015

(30) Foreign Application Priority Data

Oct. 17, 2013 (JP) ................. 2013-216289
Jul. 30, 2014 (JP) ................. 2014-154385

(51) Int. Cl.
| | | |
|---|---|---|
| H01M 4/02 | (2006.01) | |
| H01M 4/525 | (2010.01) | |
| H01M 4/505 | (2010.01) | |
| C01G 53/00 | (2006.01) | |
| H01M 4/131 | (2010.01) | |

(52) U.S. Cl.
CPC .......... *H01M 4/525* (2013.01); *C01G 53/50* (2013.01); *H01M 4/505* (2013.01); *C01P 2002/52* (2013.01); *C01P 2006/22* (2013.01); *C01P 2006/40* (2013.01); *H01M 4/131* (2013.01)

(58) Field of Classification Search
CPC ...... C01D 15/02; H01M 4/131; H01M 4/364; H01M 4/62
USPC ............... 252/182.1; 429/156, 229, 203, 219
See application file for complete search history.

(56) References Cited

U.S. PATENT DOCUMENTS

| | | | |
|---|---|---|---|
| 2002/0071990 A1 | 6/2002 | Kweon et al. | |
| 2009/0280412 A1* | 11/2009 | Imanari | C01G 45/1228 429/221 |
| 2009/0309062 A1* | 12/2009 | Kawakami | C01D 15/02 252/182.1 |
| 2012/0164525 A1* | 6/2012 | Endoh | H01M 4/131 429/203 |

(Continued)

FOREIGN PATENT DOCUMENTS

| | | |
|---|---|---|
| JP | 10-79244 A | 3/1998 |
| JP | 2001-257003 A | 9/2001 |

(Continued)

*Primary Examiner* — Khanh Tuan Nguyen
(74) *Attorney, Agent, or Firm* — Andrews Kurth Kenyon LLP

(57) ABSTRACT

A positive electrode composition for a non-aqueous electrolyte secondary battery includes a lithium transition metal composite oxide represented by a formula $Li_aNi_{1-x-y}Co_xM_{n_y}M_zO_2$, wherein $1.00 \leq a \leq 1.50$, $0 < x \leq 0.50$, $0 < y \leq 0.50$, $0.00 \leq z \leq 0.02$, $0.40 \leq x+y \leq 0.70$, M is at least one element selected from the group consisting of Zr, Ti, Mg, Ta, Nb and Mo, and a boron compound that at least contains boron and oxygen.

15 Claims, 1 Drawing Sheet

(56) References Cited

U.S. PATENT DOCUMENTS

| | | | |
|---|---|---|---|
| 2012/0270093 A1* | 10/2012 | Isozaki | H01M 4/131 429/156 |
| 2013/0216913 A1 | 8/2013 | Tode et al. | |
| 2015/0079471 A1* | 3/2015 | Fang | H01M 4/62 429/219 |
| 2015/0221933 A1* | 8/2015 | Mizawa | H01M 4/525 429/223 |

FOREIGN PATENT DOCUMENTS

| | | |
|---|---|---|
| JP | 2002-124262 A | 4/2002 |
| JP | 2009-146739 A | 7/2009 |

\* cited by examiner

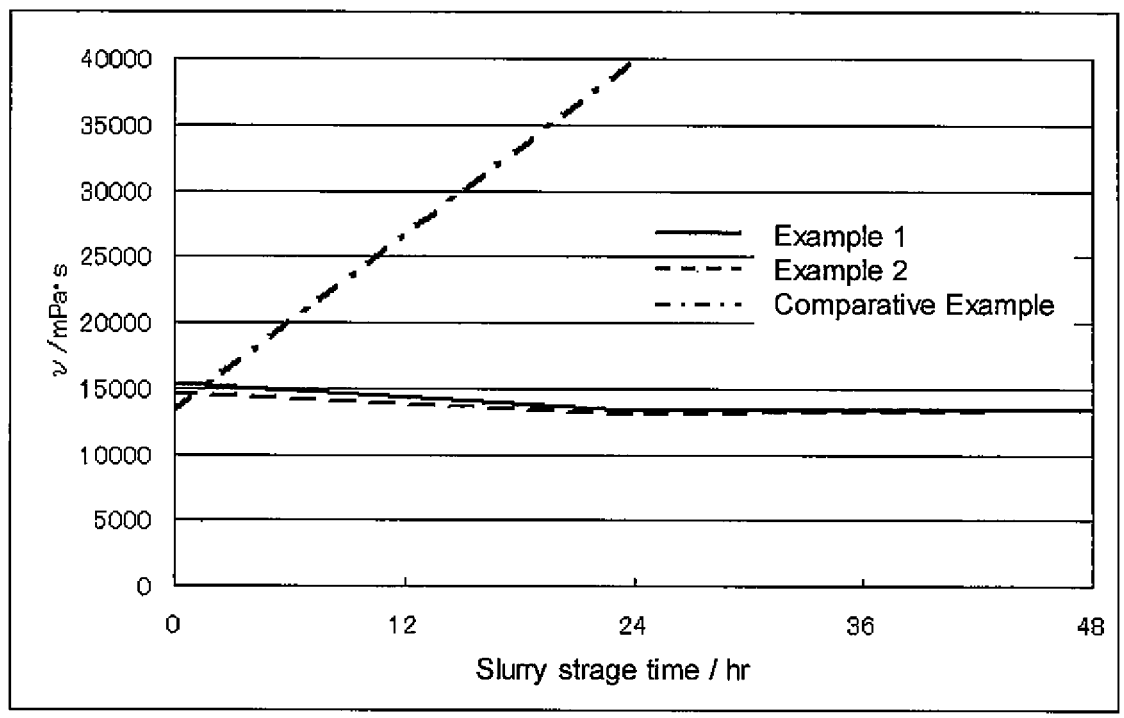

POSITIVE ELECTRODE COMPOSITION FOR NON-AQUEOUS ELECTROLYTE SECONDARY BATTERY, METHOD OF MANUFACTURING THEREOF, AND NON-AQUEOUS ELECTROLYTE SECONDARY BATTERY

CROSS REFERENCE TO RELATED APPLICATIONS

This application claims priority to Japanese Patent Application No. 2013-216289 filed on Oct. 17, 2013, and No. 2014-154385 filed on Jul. 30, 2014. The entire disclosure of Japanese Patent Application No. 2013-216289 and No. 2014-154385 are hereby incorporated herein by reference.

BACKGROUND OF THE INVENTION

1. Field of the Invention

The present disclosure relates to a positive electrode composition for a non-aqueous electrolyte secondary battery such as a lithium ion secondary battery.

2. Description of the Related Art

With the progress in spread and miniaturization of mobile devices such as VTR, mobile phone and note PC, a non-aqueous electrolyte secondary battery such as a lithium ion secondary battery has recently been used as a power supply therefore. Furthermore, the non-aqueous electrolyte secondary battery has attracted a great deal of attention as a power battery for electric vehicles and the like so as to cope with environmental problems.

There has widely been employed, as a positive electrode active material for a lithium secondary battery, $LiCoO_2$ (lithium cobalt oxide) that can constitute a 4 V class secondary battery. Cobalt, that is a constituent component of a raw material for $LiCoO_2$, is a scarce resource and is also unevenly distributed, which leads to high costs and causes anxiety about supply of the raw material.

In response to these circumstances, lithium transition metal composite oxides which have a stacked-layer structure such as nickel-cobalt-lithium manganate in which a part of the Co in $LiCoO_2$ is substituted with other metals such as Ni and Mn, have been developed. Generally, in the lithium transition metal composite oxides which have a stacked-layer structure, the greater the content ratio of nickel, more unstable the crystal structure will become, which may result in deposition of lithium compounds in the positive electrode slurry during manufacturing of the positive electrodes. Also, the smaller the content ratio of cobalt, the greater decrease in the output characteristics will be.

Also, there have been techniques to accomplish various objectives, such as mixing a boron compound such as boric acid with a lithium transition metal composite oxide, or placing a boron compound on the surface of lithium transition metal composite oxide.

JP 2001-257003A discloses a lithium secondary battery which has a positive electrode employing lithium manganate, in which a boron compound such as boron oxide, orthoboric acid, metaboric acid, or tetraboric acid, soluble in an electrolyte is contained in the positive electrode to suppress reaction between lithium manganate which has a spinel structure and hydrohalogenic acid, and thus improve cycle characteristics.

JP 2002-124262A discloses a technology in which a surface-treatment layer, which has good ion conductivity and includes a hydroxide, an oxyhydroxide, or the like of a coating element such as boron, is formed on a surface of lithium transition metal composite oxide, to increase discharge potential and to improve lifetime characteristics. In the coating that is specifically disclosed, a coating element dissolved in a solvent is deposited on a surface of lithium transition metal composite oxide, and then, the solvent is removed.

JP H10-079244A discloses a technology in which, in the process of forming an electrode made of a lithium transition metal composite oxide, boric acid or the like is added as an inorganic acid to prevent gelation of a paste for electrode. In JP H10-079244A, only lithium nickelate is disclosed as lithium transition metal composite oxide.

JP 2009-146739A discloses a technology in which on the surfaces of lithium transition metal composite oxide particles which contains nickel or cobalt as an essential component, a boric acid compound such as ammonium borate, lithium borate, or the like, is deposited, and is subjected to heat-treatment under an oxidation atmosphere to obtain high capacity of a secondary battery and to improve discharging efficiency and charging efficiency of the secondary battery. In JP 2009-146739A, only lithium nickelate in which a part of nickel is substituted with cobalt and aluminum is disclosed as a lithium transition metal composite oxide.

Nickel-cobalt-lithium manganate in which nickel, cobalt, and manganese are used as the transition metal, has a relatively good balance between cost and battery characteristics, but it is becoming increasingly difficult to meet demands in recent years on cycle characteristics and/or output characteristics in a specific compositional range.

Under these circumstances, the present invention has been made.

SUMMARY

The present disclosure provides a positive electrode composition for a non-aqueous electrolyte secondary battery, the positive electrode composition comprising: a lithium transition metal composite oxide represented by a formula $Li_aNi_{1-x-y}Co_xMn_yM_zO_2$, wherein $1.00 \leq a \leq 1.50$, $0 < x \leq 0.50$, $0 < y \leq 0.50$, $0.00 \leq z \leq 0.02$, $0.40 \leq x+y \leq 0.70$, M is at least one element selected from the group consisting of Zr, Ti, Mg, Ta, Nb and Mo, and a boron compound that at least comprises boron and oxygen. The positive electrode composition improves output characteristics of the battery, as well as cycle characteristics and viscosity stability of a positive electrode slurry.

BRIEF DESCRIPTION OF THE DRAWINGS

FIG. 1 shows a time-dependent change in viscosity of positive electrode slurries prepared using a positive electrode composition of Examples 1, 2 and Comparative Example 1.

DETAILED DESCRIPTION OF THE INVENTION

The positive electrode composition of the present invention will be described in detail by way of embodiments and Examples. However, the present invention is not just limited only to these illustrative and exemplary.

An aim of the present disclosure is to provide a positive electrode material for a non-aqueous electrolyte secondary battery having improved cycle characteristics and output characteristics even with the use of a nickel-cobalt-lithium manganate-based lithium transition metal composite oxide.

The present inventors have intensively studied so as to improve the above-mentioned characteristics, and thus the present invention has been completed. The present inventors have found that a positive electrode composition formed from a lithium transition metal composite oxide which has a specific composition and a boron compound which is in a specific state exerts improved output characteristics and cycle characteristics. The inventors also have found that a positive electrode slurry prepared with such the positive electrode composition exhibits little change in the viscosity over a period of time.

A positive electrode composition for a non-aqueous electrolyte secondary battery according to an embodiment of the present invention, the positive electrode composition includes a lithium transition metal composite oxide represented by a formula $Li_aNi_{1-x-y}Co_xMn_yM_zO_2$, wherein $1.00 \le a \le 1.50$, $0 < x \le 0.50$, $0 < y \le 0.50$, $0.00 \le z \le 0.02$, $0.40 \le x+y \le 0.70$, M is at least one element selected from the group consisting of Zr, Ti, Mg, Ta, Nb and Mo, and a boron compound that at least contains boron and oxygen.

A method of manufacturing a positive electrode composition for a non-aqueous electrolyte secondary battery according an embodiment of the present invention includes, synthesizing a lithium transition metal composite oxide represented by a general formula $Li_aNi_{1-x-y}Co_xMn_yM_zO_2$, wherein $1.00 \le a \le 1.50$, $0 < x \le 0.50$, $0 < y \le 0.50$, $0.00 \le z \le 0.02$, $0.40 \le x+y \le 0.70$, M is at least one element selected from the group consisting of Zr, Ti, Mg, Ta, Nb and Mo, mixing the lithium transition metal composite oxide and a raw material of the boron compound to obtain raw material mixture, and calcining the raw material mixture.

The positive electrode composition according to embodiments includes the features as described above, so that cycle characteristics and output characteristics can be improved without impairing characteristics of nickel-cobalt-lithium manganate. Further, a rise in slurry viscosity can be prevented in a positive electrode slurry prepared by using the positive electrode composition.

The method of manufacturing a positive electrode composition according to an embodiment of the present invention includes the features as described above, so that the positive electrode composition which can improve cycle characteristics and output characteristics, with good productivity can be obtained.

Lithium Transition Metal Composite Oxide

In the specification, a lithium transition metal composite oxide refers to a nickel-cobalt-lithium manganate-based composite oxide in which nickel, cobalt, and manganese (hereinafter, those elements are collectively named "main component") are used as the transition metal. In addition to those, zirconium, tantalum, niobium, molybdenum, or the like, may be further contained.

For example, titanium and magnesium are more preferable for improvement of cycle characteristics.

Zirconium is suitable for improvement of preservation properties.

The use of those additional elements up to about 2 mol % in total allows obtaining of respective objectives, without impairing characteristics of nickel-cobalt-lithium manganate.

An excessively high ratio of nickel in the main component may affect stability of the crystal structure, and further may cause an increase in the viscosity of positive electrode slurry. On the other hand, an excessively small ratio of nickel in the main component may cause a decrease in the charge-discharge capacity. In consideration of the balance between those, the ratio of nickel in the main component in a range of 30 mol % to 60 mol % can be preferably employed.

Meanwhile, the ratio of cobalt can be 50 mol % or less, and the ratio of manganese can be 50 mol % or less, in addition to satisfy the ratio of nickel. An excessive cobalt may cause an increase in the cost and a decrease in the output characteristics. An excessive manganese may cause a decrease in the output characteristics and in the charge-discharge capacity. The respective ratio of cobalt and manganese is more preferably in a range of 5 mol % to 35 mol %, which provides good balance in the characteristics described above.

The greater the content of lithium in the lithium transition metal composite oxide, the greater the output characteristics but more difficult to synthesize. Even when synthesis is achieved, excessive calcination tends to follow and handling thereof becomes difficult. In light of those given above, the amount of lithium in the nickel site may be in a range of 100 mol % to 150 mol %. In consideration of the balance of characteristics, the ease of synthesis, or the like, 105 mol % to 125 mol % can be preferably employed.

In light of those given above, a lithium transition metal composite oxide may be represented by a general formula $Li_aNi_{1-x-y}Co_xMn_yM_zO_2$, wherein $1.00 \le a \le 1.50$, $0 < x \le 0.50$, $0 < y \le 0.50$, $0.00 \le z \le 0.02$, $0.40 \le x+y \le 0.70$, M is at least one element selected from the group consisting of Zr, Ti, Mg, Ta, Nb and Mo. However, at least one of output characteristics and cycle characteristics cannot be satisfied according to the formula. Further, a rise in the viscosity of the positive electrode slurry likely to occur, so that in combination with a boron compound to be described below, a positive electrode composition may be formed.

Boron Compound

In the positive electrode composition according to the embodiments, a boron compound contains at least boron and oxygen. Although the details are unknown, at least a portion of the boron compound seems to form a composite oxide with lithium and the like. At least a portion of the boron compound is considered to be present on the surface of the particles of lithium transition metal composite oxide, in a form of a coating or the like. The form such as a coating is preferable for its high effect for preventing elution of the lithium contained in the positive electrode slurry into the binder.

The boron compound as described above is obtained by mixing the lithium transition metal composite oxide with a raw material compound of the boron compound, and then calcining the mixture. It is considered that at least a portion of the raw material compound eventually reacts with a portion of elements such as lithium in the lithium transition metal composite oxide to form a composite oxide. The form of the composite oxide obtained in such a manner has a different form from that obtained by simply physically mixing the lithium transition metal composite oxide with a raw material compound of the boron compound. The difference may be confirmed by the use of XPS (X-ray photoelectron spectroscopy) spectrum or the like.

The content of the boron compound in the positive electrode composition is preferably 2.0 mol % or less as boron with respect to the lithium transition metal composite oxide. An excessive amount of the boron compound may lead a decrease in the charge-discharge capacity of the entire positive electrode composition. An excessively small amount of the boron compound may lead unsatisfactory effect in prevention of elution of lithium described above. Preferable range may be 0.5 mol % to 1.5 mol %.

The raw material compound of the boron compound is preferably at least one compound selected from the group consisting of boron oxide, oxo-acid of boron, and oxo-acid salt of boron, for resulting boron compound is formed suitably for the aim of the embodiments.

Examples of oxo-acid of boron include orthoboric acid, metabolic acid, and polyborates such as diboric acid and triboric acid. Examples of oxo-acid salt of boron include orthoboric acid salt, metabolic acid salt, and polyborates salts such as diboric acid salt and triboric acid salt.

In a case that an oxo-acid salt is used for the raw material compound, a lithium salt or an ammonium salt is preferable. Specific examples thereof include lithium tetraborate ($Li_2B_4O_7$), ammonium pentaborate ($NH_4B_5O_8$). Those raw material compounds may include hydration water.

In a case that an oxo-acid of boron is used as the raw material compound, it is preferable that handling with ease and a preferable form of the final boron compound can be obtained. Particularly, orthoboric acid (so called a common boric acid) is preferable.

Manufacturing Positive Electrode Composition

The method for producing a positive electrode composition of the present embodiment will be described below. A method of manufacturing a positive electrode composition includes synthesizing a lithium transition metal composite oxide, mixing the lithium transition metal composite oxide with a raw material compound of the boron compound to obtain raw material mixture, and calcining the raw material mixture.

Synthesizing

A lithium transition metal composite oxide can be synthesized by appropriately using known techniques. A raw material mixture is prepared by, for example, mixing raw material compounds which can be decomposed at high temperature to achieve a target composition, by dissolving a raw material compound in a solvent and producing a precipitate by adjusting the temperature and pH, and adding a complexing agent or the like. The raw material mixture thus obtained is then calcined at a temperature at about 700° C. to about 1,100° C.

Mixing

The lithium transition metal composite oxide obtained in the synthesizing is adequately mixed with a raw material compound of the boron compound to obtain a raw material mixture. Sufficient mixing can be obtained by using an existing mixing machine or the like, as long as uneven distribution of the components in the mixture is not resulted. It is more preferable that, by using mechanochemical effect, the boron compound is disposed on the particle surface of the lithium transition metal composite oxide, in a form of covering or the like. In the mixing, at least a portion of the raw material of the boron compound seems to form a composite oxide with lithium and the like. For the raw material compound, at least one compound selected from the group consisting of boron oxide, oxo-acid of boron, and oxo-acid salt of boron is preferably used as described above. In a case that an oxo-acid salt of boron is used for the raw material compound, a lithium salt or an ammonium salt is preferable. As described above, for the raw material compound, an oxo-acid salt of boron is more preferable, and an orthoboric acid of boron is particularly preferable.

As described above, the raw material mixture can be obtained.

Calcining

The positive electrode composition can be obtained by calcining the raw material mixture. A large portion of the boron compound in the positive electrode composition thus obtained exist in a form of covering the surface of the particles of the lithium transition metal composite oxide. The boron compound obtained by the calcining and which covers the surface of the particles of the lithium transition metal composite oxide is considered to form a chemical or physical bonding, and is firmly integrated with the elements constituting the lithium transition metal composite oxide. As a result, elution of lithium from the lithium transition metal composite oxide can be prevented and a rise in the viscosity of the positive electrode slurry can be prevented. Further, the lithium ion conductivity in the entire positive electrode composition can be enhanced, which contributes an improvement in the output characteristics.

When the calcining temperature is too high, reaction between the lithium transition metal composite oxide and the boron compound may excessively proceed to cause a disruption in exhibiting the inherent characteristics of the lithium transition metal composite oxide, so that caution has to be exercised. In contrast, when the calcining temperature is too low, effects of the calcining may not be expected. Preferable range of the calcining temperature is 450° C. or less, more preferably 200° C. to 400° C.

As described above, the positive electrode composition according to the embodiment can be obtained.

EXAMPLE 1

In a reaction vessel, pure water in a stirring state was prepared and then an aqueous nickel sulfate solution, an aqueous cobalt sulfate solution and an aqueous manganese sulfate solution are added dropwise in a flow ratio that achieves Ni:Co:Mn of 4:3:3. After completion of the dropwise addition, a solution temperature is controlled to 50° C. and a given amount of an aqueous sodium hydroxide solution was added dropwise to obtain a nickel-cobalt-manganese composite hydroxide. The obtained precipitate was washed with water, filtered, separated and then mixed with lithium carbonate and zirconium oxide (IV) so that Li:(Ni+Co+Mn):Zr achieves 1.07:1:0.005 to obtain a mixed raw material. The obtained mixed raw material was calcined under an air atmosphere at 885° C. for 15 hours to obtain a calcined body. The obtained calcined body was ground and then dry-sieved to obtain a lithium transition metal composite oxide represented by the composition formula: $Li_{1.07}Ni_{0.4}Co_{0.3}Mn_{0.3}Zr_{0.005}O_2$.

Using a high-speed shear-type mixer, the obtained lithium transition metal composite oxide was mixed with 0.5 mol % of boric acid which is the raw material of the boron compound, to obtain a raw material mixture. The obtained raw material mixture was calcined at 250° C. for 10 hours in the atmosphere, to obtain the target positive electrode composition.

EXAMPLE 2

A positive electrode composition was obtained in a same manner as in Example 1, except for the boric acid for mixing was 1.0 mol % with respect to the lithium composite oxide.

EXAMPLE 3

Precipitate of a nickel-cobalt-manganese complex hydroxide was obtained in the same manner as in Example 1 except that a flow ratio of Ni:Co:Mn achieves 5:2:3. The obtained precipitate is washed with water, filtered, and separated, and in a same manner as in Example 1 except with a mixing ratio that achieves Li:(Ni+Co+Mn):Zr of 1.14:1:

0.005, a lithium transition metal composite oxide represented by the composition formula $Li_{1.14}Ni_{0.5}Co_{0.2}Mn_{0.3}Zr_{0.005}O_2$ was obtained.

Using a high-speed shear-type mixer, the obtained lithium transition metal composite oxide was mixed with 0.3 mol % of boric acid which is the raw material of the boron compound, to obtain a raw material mixture. The obtained raw material mixture was calcined at 250° C. for 10 hours in the atmosphere, to obtain the target positive electrode composition.

EXAMPLE 4

A positive electrode composition was obtained in a same manner as in Example 3, except for the boric acid for mixing was 0.5 mol % with respect to the lithium composite oxide.

EXAMPLE 5

A positive electrode composition was obtained in a same manner as in Example 3, except for the boric acid for mixing was 1.3 mol % with respect to the lithium composite oxide.

EXAMPLE 6

A positive electrode composition was obtained in a same manner as in Example 3, except that the raw material mixture is calcined at 350° C. for 10 hours in the atmosphere.

EXAMPLE 7

A positive electrode composition was obtained in a same manner as in Example 3, except that the raw material mixture is calcined at 500° C. for 10 hours in the atmosphere.

EXAMPLE 8

A positive electrode composition was obtained in a same manner as in Example 3, except for 0.5 mol % of a lithium metaboric acid was used as a raw material of boron compound.

COMPARATIVE EXAMPLE 1

The lithium transition metal composite oxide in Example 1 was used as comparative example.

COMPARATIVE EXAMPLE 2

The lithium transition metal composite oxide in Example 3 was used as comparative example.

[Evaluation of Output Characteristics]

With respect to Examples 1 to 8 and Comparative Examples 1 and 2 DC-IR (direct-current internal resistance) is measured in the following manner.

1. Forming Positive Electrode

A positive electrode slurry was prepared by dispersing 85 parts by weight of the positive electrode composition, 10 parts by weight of acetylene black and 5.0 parts by weight of PVDF (polyvinylidene fluoride) in NMP (N-methyl-2-pyrrolidone). The obtained positive electrode slurry was coated on an aluminum foil and dried, and then the coated electrode is compression-formed by a roll press machine and cut into pieces with a predetermined size to obtain positive electrodes.

2. Forming Negative Electrode

A negative electrode slurry was prepared by dispersing 97.5 parts by weight of artificial graphite, 1.5 parts by weight of CMC (carboxymethylcellulose), and 1.0 parts by weight of SBR (styrene butadiene rubber) in water. The obtained negative electrode slurry was coated on an aluminum foil, dried, compression formed by a roll press and then cut into a given size to obtain negative electrodes.

3. Preparing Non-aqueous Electrolyte EC (ethylene carbonate) was mixed with MEC (methyl ethyl carbonate) at a volume ratio of 3:7 to obtain a mixed solvent. Lithium hexafluorophosphate ($LiPF_6$) was dissolved in the obtained mixed solvent so that the concentration becomes 1 mol/l to obtain a non-aqueous electrolyte.

4. Assembling Battery for Evaluation

A lead electrode was attached to each current collector of the positive and negative electrodes, followed by vacuum drying at 120° C. Then, a separator made of porous polyethylene was provided between the positive electrode and the negative electrode, and they were placed in a bag-shaped laminate pack. After that, moisture adsorbed to each member was removed by vacuum drying at 60° C. After vacuum drying, the aforementioned non-aqueous electrolyte was injected into the laminate pack, followed by sealing to obtain a laminate-type non-aqueous electrolyte secondary battery for evaluation.

5. Measuring DC-IR

The obtained battery was aged with a micro current thereby allowing the electrolyte to permeate sufficiently into the positive and negative electrodes. Then, high-current discharging and micro-current charging were alternately repeated. The charging capacity at the 10th charging was indicated as the total charging capacity of the battery, and after 10th discharging, 40% of the total charging capacity was charged. After charging, the battery was put in a constant temperature bath set at −25° C. and was left for 6 hours, and then discharged at 0.02 A, 0.04 A and 0.06 A to measure respective voltage. The current was arranged on a horizontal axis and the voltage was arranged on a vertical axis, and intersection points were plotted. The slope of each of the straight lines obtained along the respective plots was determined as DC-IR.

A low DC-IR indicates good output characteristics.

Measuring Viscosity of Positive Electrode Slurry Viscosity of the positive electrode slurries according to Examples 1, 2 and Comparative Example 1 were respectively measured in the following manner.

1. Measuring Initial Viscosity

In a 150 ml polyethylene container, 30 g of a positive electrode composition, 1.57 g of PVDF and 12.48 g of NMP were placed and kneaded at a normal temperature (about 25° C.) for 5 minutes. After kneading, the viscosity of the obtained slurry was immediately measured by an E-type viscometer. The measurement was carried out using a cone-plate type blade and a rotation speed of the rotor of 5 rpm. Thus, a measured value of an initial viscosity was obtained.

2. Evaluating Change in Viscosity with Time

Next, the slurry in the polyethylene container was left still in a thermostatic bath at 60° C. After 24 hours and 48 hours, the viscosity was measured respectively. Before each measurement, the slurry was kneaded at a normal temperature for 2 minutes.

Evaluation of Cycle Characteristics

In the Examples 1 to 8 and Comparative Examples 1 and 2, Cycle Characteristics were measured in the manner described below.

The obtained battery was aged with a micro current thereby allowing the electrolyte to permeate sufficiently into the positive and negative electrodes. After aging, the battery was placed in a thermostatic chamber set at 20° C., charge and discharge were repeated as a charging at a charging voltage of 4.2 V and a charging current of 1.0 C ("1 C" is the current to finish discharging in one hour) and a discharging at a discharging voltage of 2.75 V and a discharging current of 1.0 C as one cycle. The discharge capacity at the n-th cycle divided by the discharge capacity at the first cycle was determined as the discharge capacity retention percentage rate of the n-th cycle (QsR). In this description, "QsR" refers to a discharge capacity retention percentage rate of the 200th cycle.

Large value of discharge capacity retention rate indicates good cycle characteristics.

Table 1 shows the composition formulae (shown as "Composition A") of the lithium transition metal composite oxide, the composition formulae (shown as "Composition B") of the raw material compound of boron compound, and the boron content (shown as "B content") in positive electrode composition, and Table 2 shows the battery characteristics, respectively, of Examples 1 to 8, and Comparative Examples 1 and 2.

FIG. 1 shows the viscosity change of positive electrode slurries using the positive electrode compositions of Examples 1, 2 and Comparative Example 1, respectively.

TABLE 1

|  | Composition A | Composition B | Calcining Temperature/° C. | B Content*/ (mol %) |
|---|---|---|---|---|
| EXAMPLE 1 | $Li_{1.07}Ni_{0.4}Co_{0.3}Mn_{0.3}Zr_{0.005}O_2$ | $H_3BO_3$ | 250 | 0.5 |
| EXAMPLE 2 |  |  |  | 1.0 |
| COMPARATIVE EXAMPLE 1 |  | — | — | — |
| EXAMPLE 3 | $Li_{1.14}Ni_{0.5}Co_{0.2}Mn_{0.3}Zr_{0.005}O_2$ | $H_3BO_3$ | 250 | 0.3 |
| EXAMPLE 4 |  |  |  | 0.5 |
| EXAMPLE 5 |  |  |  | 1.3 |
| EXAMPLE 6 |  |  | 350 | 0.5 |
| EXAMPLE 7 |  |  | 500 |  |
| COMPARATIVE EXAMPLE 2 |  | — | — | — |
| EXAMPLE 8 |  | $LiBO_2$ | 250 | 0.5 |

*The amount of boron with respect to lithium transition metal composite oxide

TABLE 2

|  | DC-IR/Ω | QsR/% |
|---|---|---|
| EXAMPLE 1 | 15.5 | 83.1 |
| EXAMPLE 2 | 15.1 | 81.5 |
| COMPARATIVE EXAMPLE 1 | 17.5 | 78.5 |
| EXAMPLE 3 | 16.1 | 89.8 |
| EXAMPLE 4 | 15.7 | 87.8 |
| EXAMPLE 5 | 18.5 | 89.6 |
| EXAMPLE 6 | 15.3 | 88.3 |
| EXAMPLE 7 | 16.8 | 89.7 |
| COMPARATIVE EXAMPLE 2 | 20.3 | 82.0 |
| EXAMPLE 8 | 19.3 | 87.7 |

As can be seen from Table 1 and Table 2, both the output characteristics and the cycle characteristics are improved in Examples 1, 2 and Examples 3-8 where boric acid is used as the raw material compound of the boron compounds and calcination is conducted, compared to that in Comparative Example 1 or 2 where the boron compounds are not included. Also, as can be seen from FIG. 1, little change in the viscosity of the positive electrode slurries is observed in Examples 1, 2 where boric acid is used as the raw material compound of the boron compounds, but after 24 hours, the viscosity of the positive electrode slurries rapidly rose to the measurement limit (40,000 mPa·s) in Comparative Example 1 where the boron compound is not included.

With the use of the positive electrode composition according to the disclosure, the nonaqueous electrolyte secondary battery can exert both higher output characteristics and higher cycle characteristics. Further, a rise in the viscosity of the positive electrode slurry can be suppressed, so that processing and yield in manufacturing of the batteries can be improved. As described above, the non-aqueous electrolyte secondary battery using the positive electrode composition of the present invention can be suitably used not only in mobile devices such as a mobile phone, a note PC and a digital camera, but also in a high-output power supply for large-size applications such as a battery for an electric vehicle.

As described above, it should be obvious that various other embodiments are possible without departing the spirit and scope of the present invention. Accordingly, the scope and spirit of the present invention should be limited only by the following claims.

What is claimed is:

1. A method of manufacturing a positive electrode composition for a non-aqueous electrolyte secondary battery, the method comprising:

calcining a first raw material mixture at a temperature of 700° C. to 1100° C. to obtain a lithium transition metal composite oxide represented by a formula $Li_aNi_{1-x-y}Co_xMn_yM_zO_2$ wherein $1.00 \leq a \leq 1.50$, $0 < x \leq 0.50$, $0 < y \leq 0.50$, $0 < z \leq 0.02$, $0.40 \leq x+y \leq 0.70$, M is at least one element selected from the group consisting of Zr, Ti, Mg, Ta, Nb and Mo;

mixing the lithium transition metal composite oxide with a boron compound to obtain a second raw material mixture; and calcining the second raw material mixture at a temperature not greater than 350° C.

2. The method of manufacturing a positive electrode composition for a non-aqueous electrolyte secondary battery according to claim 1, wherein the boron compound is at least one compound selected from the group consisting of boron oxide, oxo-acid of boron, and oxo-acid salt of boron.

3. The method of manufacturing a positive electrode composition for a non-aqueous electrolyte secondary battery according to claim 2, wherein the second raw material mixture is calcined at a temperature of 200° C. to 350° C.

4. The method of manufacturing a positive electrode composition for a non-aqueous electrolyte secondary battery according to claim 2, wherein the boron compound is present in an amount of 2.0 mol % or less as boron with respect to the lithium metal composite oxide.

5. The method of manufacturing a positive electrode composition for a non-aqueous electrolyte secondary battery according to claim 2, wherein the boron compound is present in an amount of 1.5 mol % or less as boron with respect to the lithium metal composite oxide.

6. The method of manufacturing a positive electrode composition for a non-aqueous electrolyte secondary battery according to claim 2, wherein the boron compound is present in an amount of 0.5% to 1.5 mol % as boron with respect to the lithium metal composite oxide.

7. The method of manufacturing a positive electrode composition for a non-aqueous electrolyte secondary battery according to claim 1, wherein the boron compound is orthoboric acid.

8. The method of manufacturing a positive electrode composition for a non-aqueous electrolyte secondary battery according to claim 7, wherein the second raw material mixture is calcined at a temperature of 200° C. to 350° C.

9. The method of manufacturing a positive electrode composition for a non-aqueous electrolyte secondary battery according to claim 7, wherein the boron compound is present in an amount of 2.0 mol % or less as boron with respect to the lithium metal composite oxide.

10. The method of manufacturing a positive electrode composition for a non-aqueous electrolyte secondary battery according to claim 7, wherein the boron compound is present in an amount of 1.5 mol % or less as boron with respect to the lithium metal composite oxide.

11. The method of manufacturing a positive electrode composition for a non-aqueous electrolyte secondary battery according to claim 7, wherein the boron compound is present in an amount of 0.5% to 1.5 mol % as boron with respect to the lithium metal composite oxide.

12. The method of manufacturing a positive electrode composition for a non-aqueous electrolyte secondary battery according to claim 1, wherein the second raw material mixture is calcined at a temperature of 200° C. to 350° C.

13. The method of manufacturing a positive electrode composition for a non-aqueous electrolyte secondary battery according to claim 1, wherein the boron compound is present in an amount of 2.0 mol % or less as boron with respect to the lithium metal composite oxide.

14. The method of manufacturing a positive electrode composition for a non-aqueous electrolyte secondary battery according to claim 1, wherein the boron compound is present in an amount of 1.5 mol % or less as boron with respect to the lithium metal composite oxide.

15. The method of manufacturing a positive electrode composition for a non-aqueous electrolyte secondary battery according to claim 1, wherein the boron compound is present in an amount of 0.5% to 1.5 mol % as boron with respect to the lithium metal composite oxide.

* * * * *